Oct. 1, 1935.　　　E. A. ROSIN ET AL　　　2,015,730
SHEET GLASS INSPECTION APPARATUS
Filed Oct. 15, 1931　　　2 Sheets-Sheet 2
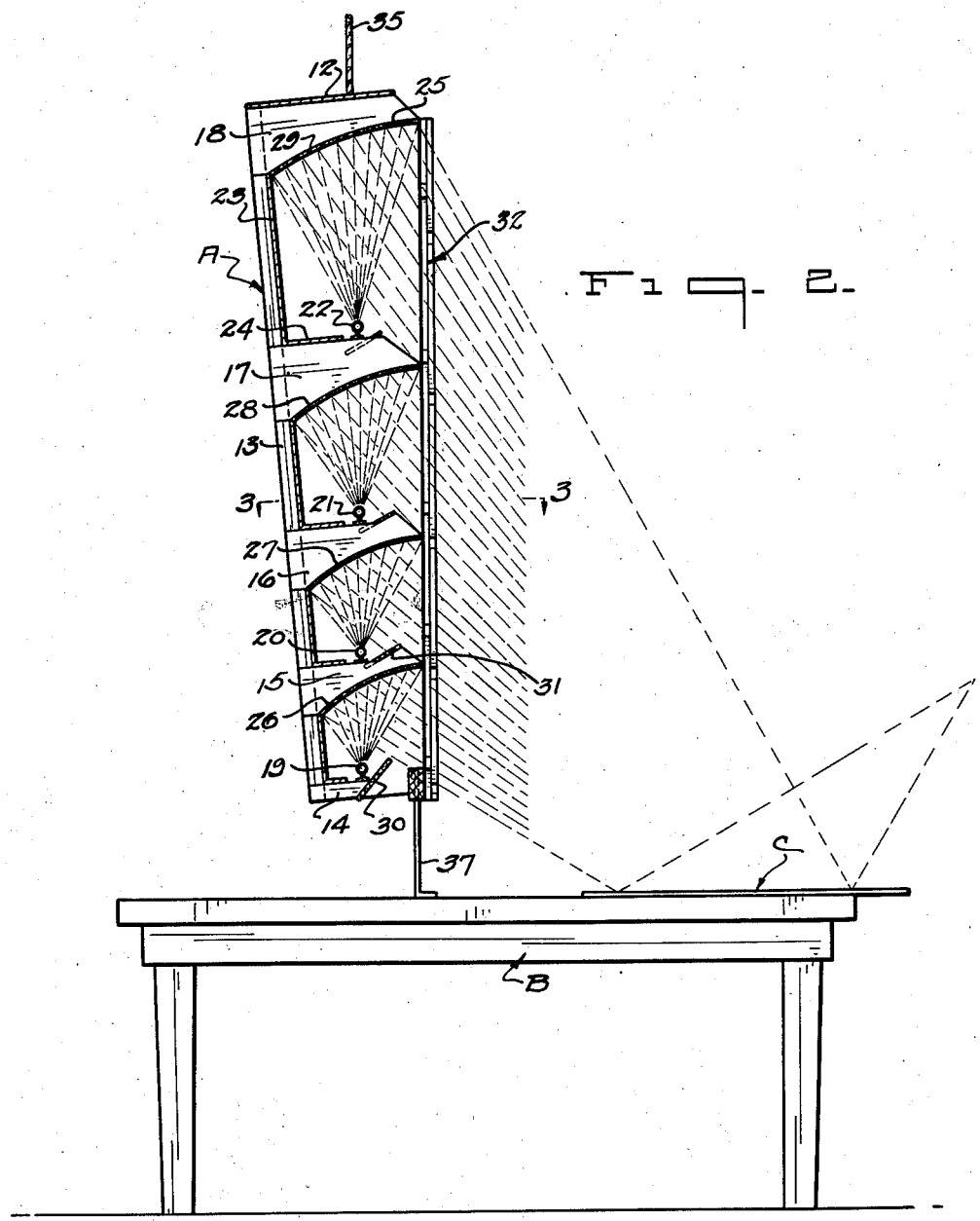
INVENTORS
Edwin A. Rosin.
Alden H. Stebbins.
BY
Frank Fraser
ATTORNEY

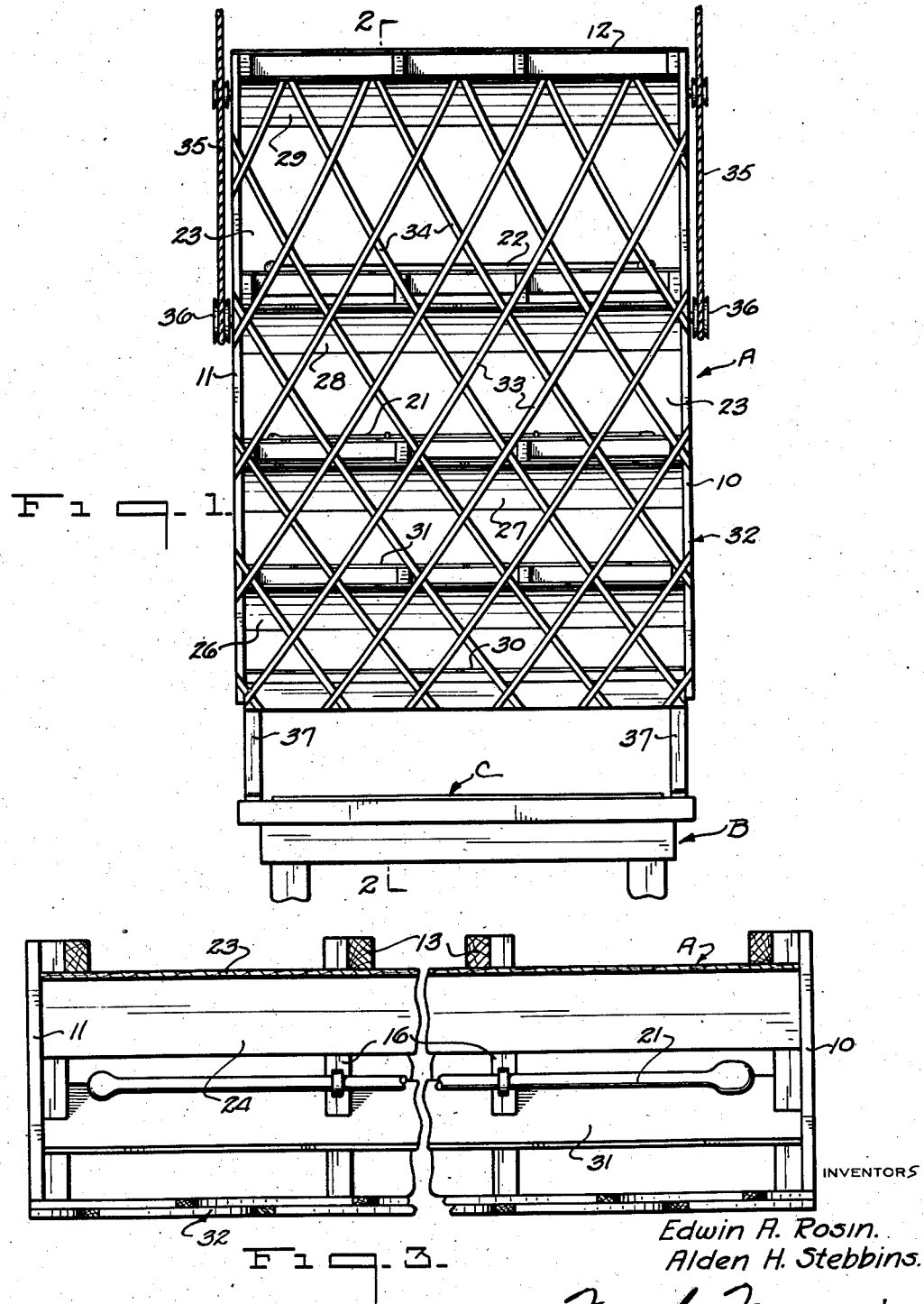

UNITED STATES PATENT OFFICE 2,015,730

SHEET GLASS INSPECTION APPARATUS

Edwin A. Rosin and Alden H. Stebbins, Toledo, Ohio, assignors to Libbey-Owens-Ford Glass Company, Toledo, Ohio, a corporation of Ohio Application October 15, 1931, Serial No. 569,004

20 Claims. (Cl. 88—14)

The present invention relates to an apparatus for use in the inspection of sheet or plate glass and has for one of its important objects the provision of an improved apparatus permitting the rapid and thorough inspection of the glass and with a minimum effort on the part of the inspector.

Some other important objects of the invention are the provision of a novel glass inspection apparatus including lighting means, the light from which will be of practically constant intensity and will be reflected upon the glass in such a manner as to entirely eliminate glare; and the provision of an inspection apparatus whereby a practically uniform reflection is obtained so that every part of the sheet to be inspected may be exposed to the inspector and under uniform conditions of illumination.

A further object of the invention is the provision of a glass inspection apparatus embodying a substantially uniformly illuminated white background which is reflected in the glass, together with means interposed between the white background and glass for breaking up the white background so that contrasting light and dark areas will be reflected in the glass.

Other objects and advantages of the invention will become more apparent during the course of the following description when taken in connection with the accompanying drawings.

In the drawings forming a part of this application and wherein like numerals are employed to designate like parts throughout the same, Fig. 1 is a front elevation of a glass inspection apparatus constructed in accordance with the present invention;

Fig. 2 is a vertical section taken substantially on line 2—2 of Fig. 1, and

Fig. 3 is a transverse section taken substantially on line 3—3 of Fig. 2.

Referring now more particularly to the accompanying drawings, the letter A designates in its entirety the improved glass inspection apparatus forming the subject-matter of the present invention and which is here shown as being mounted above a table B upon the top of which the glass sheet or plate C to be inspected is adapted to be placed.

The inspection apparatus A includes a substantially rectangular frame consisting of the spaced vertical side members 10 and 11 connected together at their upper ends by the substantially horizontal cross member 12 constituting the top of the apparatus. Secured to the top member 12 are a plurality of spaced substantially vertical connecting members 13 arranged substantially parallel with side members 10 and 11. Carried by each of said side members 10 and 11 and also by each of the vertical connecting members 13 are a plurality of forwardly directed brackets superimposed with respect to one another and designated 14, 15, 16, 17 and 18 respectively.

Supported upon the brackets 14, 15, 16 and 17 and extending transversely of the frame are the lamps 19, 20, 21 and 22 respectively, these lamps being preferably of the mercury vapor type and constituting the lighting means for the apparatus. Arranged behind each of the lamps 19 to 22 inclusive and secured to the vertical connecting members 13 is a backboard 23, while carried by each of the brackets 14, 15, 16 and 17 is a horizontal bottom board 24. The bottom edge of each of the brackets 15, 16, 17 and 18 is arcuately curved as indicated at 25, and secured to the arcuately curved edges of these brackets are the arcuately curved reflectors 26, 27, 28 and 29 respectively. The bottom surfaces of the reflectors, as well as the inner surfaces of the backboards 23, bottom boards 24, and the exposed portions of the brackets are painted a light color and preferably flat white so as to give a white light reflecting background.

In practice, the inspection apparatus here provided is adapted to be suspended in a substantially vertical position above the table B, and the light thrown upwardly from the lamps 19 to 22 is adapted to be reflected downwardly upon the glass sheet C as clearly shown in Fig. 2. Therefore, as will be seen, there is no direct light thrown upon the glass sheet being inspected but that, on the contrary, an indirect lighting is employed. In order to hide the lamps and prevent them from shining directly into the inspector's eyes, there is carried by the bottom brackets 14 an inclined plate 30 arranged in front of lamp 19, and a similar inclined plate 31 is carried by the brackets 15, 16 and 17 and arranged in front of the respective lamps.

It will be noted that the reflectors gradually increase in size from the lower reflector 26 to the top reflector 29, and this gradual increase in size is provided in order to compensate for the increased distance of the reflectors from the eyes of the inspector. In other words, each reflector constitutes one-quarter of the reflected background and, due to the particular arrangement shown, and the positioning of the individual reflectors, a practically uniform reflection will be had. That is to say, the reflectors substantially overlap one another in offset relationship so that there are no noticeable gaps between the light thrown from the different reflectors. Otherwise stated, there is no defining where the light from one reflector begins and the other ends.

Mounted in front of the lamps 19 to 22 and carried by the supporting frame is a lattice-work 32 made up of a plurality of wooden strips 33 and 34 which are preferably, though not necessarily, arranged in criss-cross fashion as best shown in Fig. 1. The strips 33 and 34 forming the lattice-work are painted a relatively dark color and preferably black so that the contrast between the black lattice-work and the white background when reflected in the glass will be such as to show up all surface imperfections therein such as, for example, smears, scratches, etc. The lamps provide a uniformly illuminated white background which is reflected in the glass. However, the black strips interposed between the white background and the glass will cause a breaking up of the reflected white background so that contrasting light and dark areas will be seen in the glass. In other words, there will be reflected in the glass black lines which are superimposed upon a white surface and this contrast facilitates a rapid and thorough inspection of the glass. The strips 33 and 34 are preferably slightly curved as shown so that, when they are reflected in the glass, they will appear straight, and whereas the diamond-shaped openings between the strips gradually increase in length from the bottom of the lattice-work to the top thereof, when reflected in the glass, they will appear to be of uniform size throughout the vertical extent of the frame.

When inspecting a sheet of glass C with the present invention, the sheet is placed horizontally upon the table B in front of the inspection apparatus A. The lamps 19 to 22 being in operation, the light will be thrown upwardly therefrom and then reflected by means of reflectors 26 to 29 downwardly upon the glass sheet. As pointed out above, there will be reflected within the glass a plurality of black lines superimposed upon a white surface and this contrast between the black and white areas will be such as to show up all surface imperfections in the glass. In the event the sheet being inspected is relatively large, it may have to be moved over the table until the entire sheet has been inspected, and of course during inspection, the inspector will mark the glass for defects or cut it into desirable sized panes in the usual way. Of course, it is not absolutely necessary that the reflecting background be painted white and the lattice-work black. On the contrary, any desired colors may be used just so long as the reflecting background is of a lighter color than the lattice-work so that the necessary contrast may be had. The reflectors also need not necessarily be arcuately curved as here shown.

The inspection apparatus A above described may be suspended in a substantially vertical position above the table B by means of cables or the like 35 arranged at opposite sides thereof and trained about pulleys 36 or in any other desired manner. As here shown, the lower end of the apparatus is prevented from swinging back and forth by the provision of suitable feet 37 carried by the frame and engaging the top of table B.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In an inspection apparatus for sheet or plate glass, a table upon which the glass sheet or plate is horizontally supported, lighting means including a plurality of mercury vapor lamps positioned above the table and arranged one above the other, means for reflecting the light from said lamps downwardly onto the glass, and means for cutting off the direct rays of light from the glass.

2. In an inspection apparatus for sheet or plate glass, a table upon which the glass sheet or plate is horizontally supported, lighting means including a plurality of mercury vapor lamps positioned above the table and arranged one above the other for directing light away from the sheet, means arranged in proximity to said lamps for reflecting the light downwardly onto the glass, and means for cutting off the direct rays of light from the glass so that the said glass is illuminated entirely by indirect lighting.

3. In an inspection apparatus for sheet or plate glass, a table upon which the glass sheet or plate is horizontally supported, lighting means including a plurality of mercury vapor lamps positioned above the table and arranged one above the other for directing light upwardly, means arranged above each lamp for reflecting the light downwardly onto the glass, and means for preventing any direct rays from said lamps from being thrown onto the glass.

4. In an inspection apparatus for sheet or plate glass, a table upon which the glass sheet or plate is horizontally supported, lighting means including a plurality of mercury vapor lamps positioned above the table and arranged one above the other, means for reflecting the light from said lamps downwardly onto the glass, and means independent of and positioned beneath said reflecting means for preventing the lamps from shining directly into the eyes of the inspector.

5. In an inspection apparatus for sheet or plate glass, a table upon which the glass sheet or plate is horizontally supported, lighting means including a plurality of mercury vapor lamps positioned above the table and arranged one above the other for directing light away from the sheet, means arranged in proximity to said lamps for reflecting the light downwardly onto the glass, and means independent of and positioned beneath said reflecting means in front of said lamps for shielding the eyes of the inspector therefrom.

6. In an inspection apparatus for sheet or plate glass, a table upon which the glass sheet or plate is horizontally supported, lighting means including a plurality of mercury vapor lamps positioned above the table and arranged one above the other for directing light away from the sheet, a reflector arranged in proximity to each lamp for reflecting the light downwardly onto the glass, and means positioned in front of each lamp for cutting off the direct rays of light from the glass.

7. In an inspection apparatus for sheet or plate glass, a table upon which the glass sheet or plate is horizontally supported, lighting means including a plurality of mercury vapor lamps positioned above the table and arranged one above the other for directing light upwardly, an arcuately curved reflector arranged in proximity to each lamp for reflecting the light downwardly onto the glass, and means positioned beneath the reflector in front of the respective lamp for preventing any direct rays of light from said lamp from being thrown onto the glass.

8. In an inspection apparatus for sheet or plate glass, a table upon which the glass sheet or plate is horizontally supported, a plurality of elongated arcuately curved reflectors positioned above the table and arranged substantially parallel one above the other, and separate lighting means associated with each reflector for directing light upwardly thereagainst, said reflectors acting to reflect the light downwardly onto the glass.

9. In an inspection apparatus for sheet or plate glass, a table upon which the glass sheet or plate is horizontally supported, a plurality of arcuately curved reflectors positioned above the table and arranged one above the other, and lighting means associated with each reflector for directing light upwardly thereagainst, said reflectors increasing in size from the lowermost reflector to the uppermost reflector and acting to reflect the light downwardly onto the glass.

10. In an inspection apparatus for sheet or plate glass, a table upon which the glass sheet or plate is horizontally supported, artificial lighting means positioned above the table, means forming a light colored background for reflecting the light from said lighting means downwardly onto the glass, and means interposed between the light colored background and glass for breaking up, with a contrasting effect, the said light colored background reflected in the glass.

11. In an inspection apparatus for sheet or plate glass, a table upon which the glass sheet or plate is horizontally supported, artificial lighting means positioned above the table for directing light upwardly, means arranged above said lighting means and forming a light colored background for reflecting the light downwardly upon the glass, and means interposed between the light colored background and glass for breaking up the said light colored background so that contrasting light and dark areas will be reflected in the glass.

12. In an inspection apparatus for sheet or plate glass, a table upon which the glass sheet or plate is horizontally supported, artificial lighting means positioned above the table for directing light upwardly, an arcuately curved reflector arranged above said lighting means with the inner surface thereof forming a white background for reflecting the light downwardly upon the glass, and means interposed between the white background and glass for breaking up the white background so that contrasting light and dark areas will be reflected in the glass.

13. In an inspection apparatus for sheet or plate glass, a table upon which the glass sheet or plate is horizontally supported, a frame positioned above the table, artificial lighting means carried by the frame, a reflector positioned in proximity to the lighting means and a backboard positioned behind said lighting means, the inner surfaces of said reflector and backboard forming a light background for reflecting the light downwardly upon the glass, and means interposed between the light background and glass for breaking up, with a contrasting effect, the light background reflected in the glass.

14. In an inspection apparatus for sheet or plate glass, a table upon which the glass sheet or plate is horizontally supported, artificial lighting means positioned above the table, means forming a light colored background for reflecting the light from said lighting means downwardly onto the glass, and means including a plurality of strips interposed between the light colored background and glass so that there will be reflected in the glass a plurality of dark colored lines superimposed upon and contrasting with a light colored background.

15. In an inspection apparatus for sheet or plate glass, a table upon which the glass sheet or plate is horizontally supported, lighting means positioned above the table, means in proximity to said lighting means forming a white background for reflecting the light downwardly upon the glass, and means composed of a series of strips arranged in criss-cross fashion interposed between the white background and glass so that there will be reflected in the glass a plurality of contrasting dark lines superimposed upon a white background.

16. In an inspection apparatus for sheet or plate glass, a table upon which the glass sheet or plate is horizontally supported, lighting means positioned above the table, an arcuately curved reflector arranged in proximity to said lighting means and forming a light colored background for reflecting the light downwardly upon the glass, and a relatively darker colored lattice-work interposed between the light background and glass so that there will be reflected in the glass a plurality of dark lines superimposed in contrasting fashion upon a light background.

17. In an inspection apparatus for sheet or plate glass, a table upon which the glass sheet or plate is horizontally supported, a frame positioned above the table, lighting means carried by the frame, an arcuately curved reflector positioned above the lighting means and a backboard positioned behind said lighting means, the inner surfaces of said reflector and backboard forming a white background for reflecting the light downwardly upon the glass, and a black lattice-work interposed between the white background and glass so that there will be reflected in the glass a plurality of black lines superimposed in contasting fashion upon a white background.

18. In an inspection apparatus for sheet or plate glass, a table upon which the glass sheet or plate is horizontally supported, a frame positioned above the table, a plurality of arcuately curved reflectors carried by said frame and arranged one above the other, lighting means associated with each reflector for directing light upwardly thereagainst, said reflectors increasing in size from the lowermost reflector to the uppermost reflector and acting to reflect the light downwardly onto the glass, and means composed of a series of strips arranged in criss-cross fashion interposed between the lighting means and glass so that there will be reflected in the glass a plurality of contrasting dark lines superimposed upon a light background, said strips being curved and arranged in such fashion as to provide substantially diamond shaped openings which increase in size from the bottom of the frame to the top thereof.

19. In an inspection apparatus for sheet or plate glass, a table upon which the glass sheet or plate is horizontally supported, a plurality of elongated, arcuately curved reflectors positioned horizontally above the table and also arranged in spaced, substantially parallel relation one above the other, and separate lighting means associated with and disposed beneath each reflector for directing light upwardly thereagainst, said reflectors acting to reflect the light downwardly onto the glass.

20. In an inspection apparatus for sheet or plate glass, a table upon which the glass sheet or plate is horizontally supported, lighting means including a mercury vapor lamp positioned above the table, an elongated arcuately curved reflector disposed horizontally above said lamp for reflecting the light therefrom downwardly onto the glass, and means arranged beneath said reflector and positioned in front of said lamp for cutting off the direct rays of light from the glass.

EDWIN A. ROSIN
A. H. STEBBINS.